May 26, 1970   J. R. STODDARD ET AL   3,513,695
ULTRA-LOW-SPEED DYNAMOMETER
Filed May 25, 1967   3 Sheets-Sheet 1
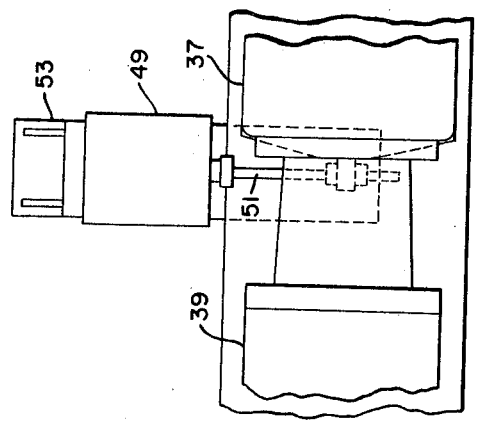
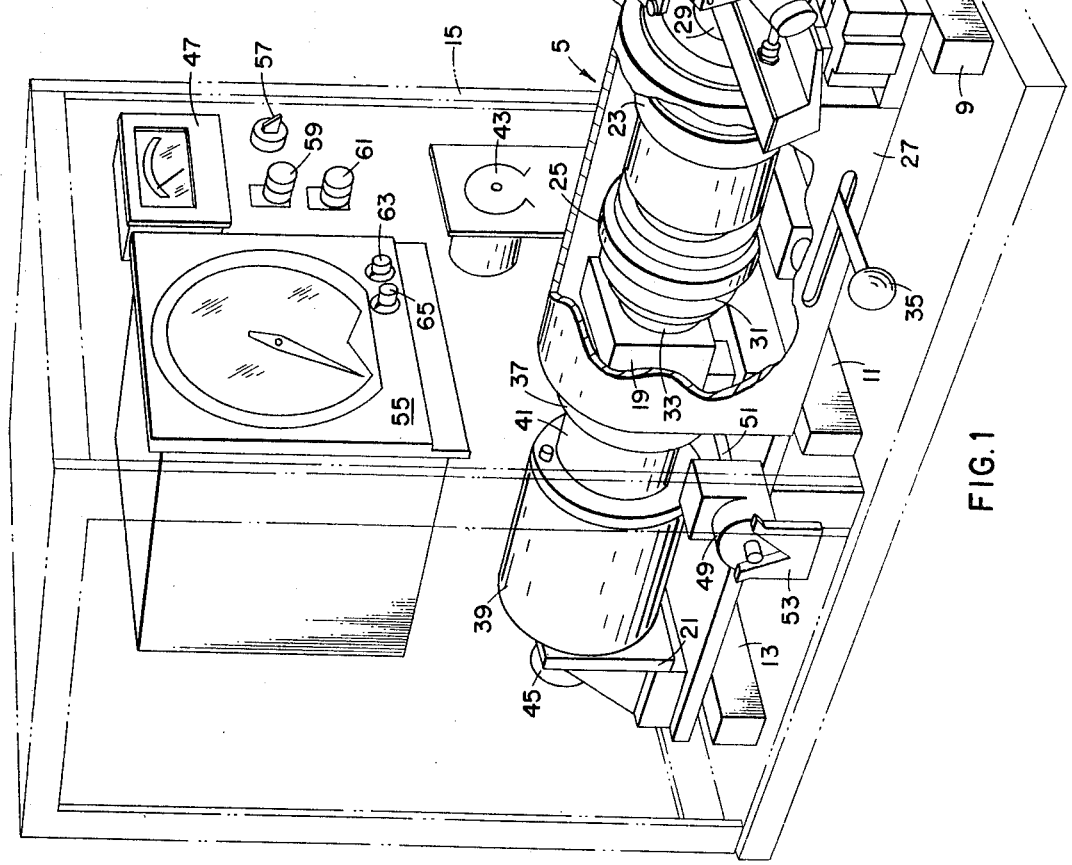
Joseph R. Stoddard
Fredrick I. Wilson,
INVENTORS.
BY Joseph R. Stoddard
Fredrick I. Wilson,
INVENTORS.

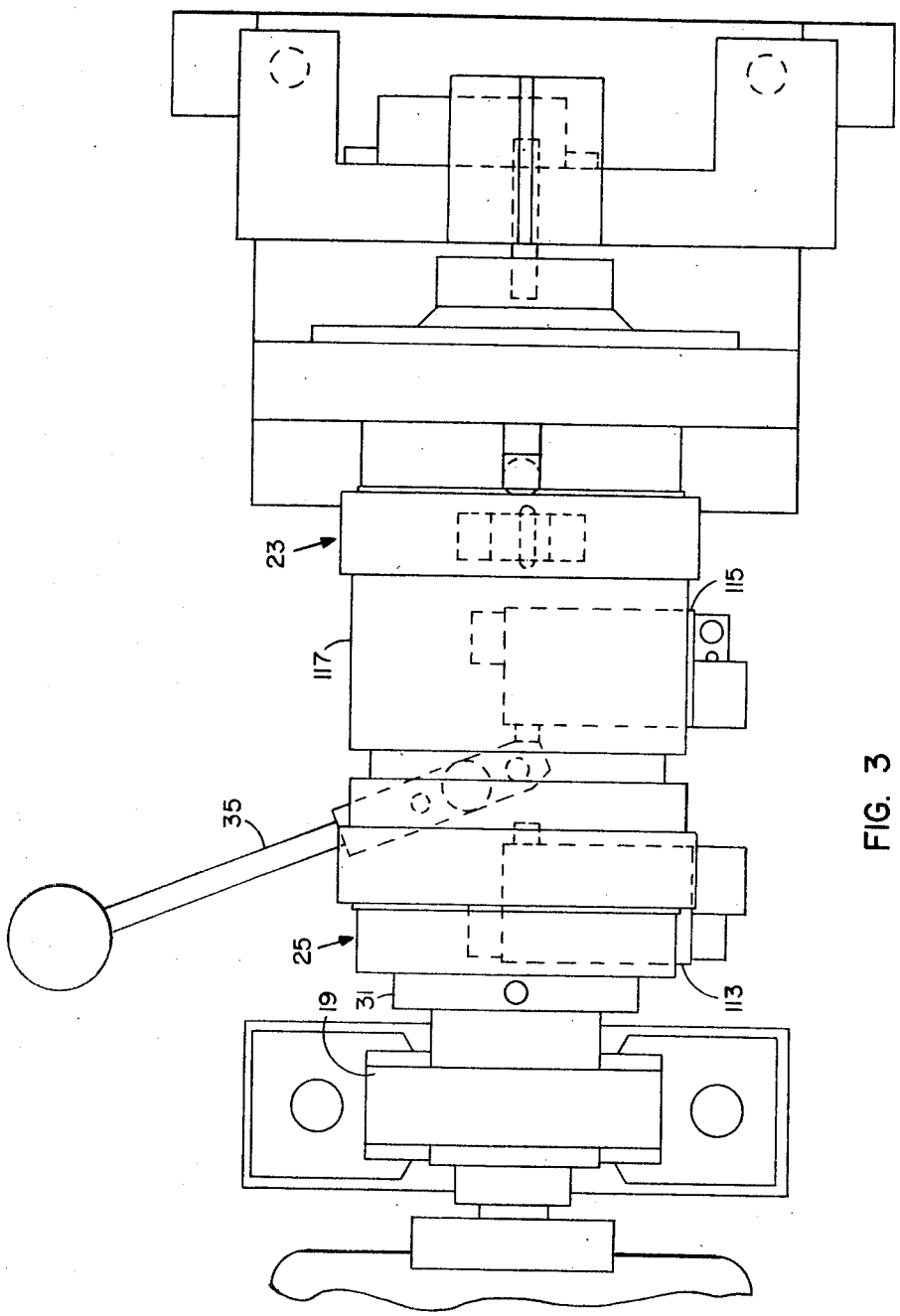

United States Patent Office 3,513,695
Patented May 26, 1970

3,513,695
ULTRA-LOW-SPEED DYNAMOMETER
Joseph R. Stoddard, Orlando, and Frederick I. Wilson, Apopka, Fla., assignors, by mesne assignments, to the United States of America as represented by the Secretary of the Army
Filed May 25, 1967, Ser. No. 642,667
Int. Cl. G01l 3/16
U.S. Cl. 73—134     5 Claims

ABSTRACT OF THE DISCLOSURE

A device for testing the speed and torque of machines having speeds as low as 150°–400° of revolution per minute and torques in the range of 60–700 inch pounds. A reversible transmission is disposed for connection between the machine being tested and a reversible variable speed motor. Means are connected to the motor for controlling the speed and direction of rotation of the motor. A load cell, loaded in opposite directions, is disposed for connection with the transmission for measuring the speed and torque of the machine.

BACKGROUND OF THE INVENTION

The testing devices known have a problem in that the reliability of the data obtained is questionable.

SUMMARY OF THE INVENTION

This invention provides a device that is connected by a gear reducer to the transmission for measurement of high torque at very slow speeds.

BRIEF DESCRIPTION OF THE DRAWING

FIG. 1 is a pictorial view partially cutaway of a dynamometer according to the present invention.

FIG. 3 is a plan view of the dynamometer.

FIG. 4 is a plan view of the connection between the load cell and gear reducer.

Referring now to FIG. 1, wherein for the purpose of illustration of the invention only, there is shown a dynamometer 5 consisting of a base 7 supported by spacer blocks 9, 11 and 13 mounted on a console bench 15 shown by broken lines. Three antifriction bearings 17, 19 and 21 are provided with centers accurately located in line and supported by brackets on plate 7. An assembly of two overrunning clutches generally shown as 23 and 25 is located between bearings 17 and 19 and is enclosed in a generally cylindrical housing 27. Clutch 23 is oriented to drive clockwise, and clutch 25 is oriented to drive counterclockwise. The clutch assembly is journaled in bearings 17 and 19 by means of an adapter shaft coupling 29 at bearing 17 and a rigid coupling 31 connected to a shaft 33 in bearing 19. As shown in FIG. 2 the drive for clutch 23 to coupling 29 is by way of drum 101, transfer pawl 103 and plate 105 which is connected to coupling 29. The drive for clutch 25 to a coupling 29' connected to shaft 33 is by way of drum 107, transfer pawl 109 and plate 111.

Figure 2:
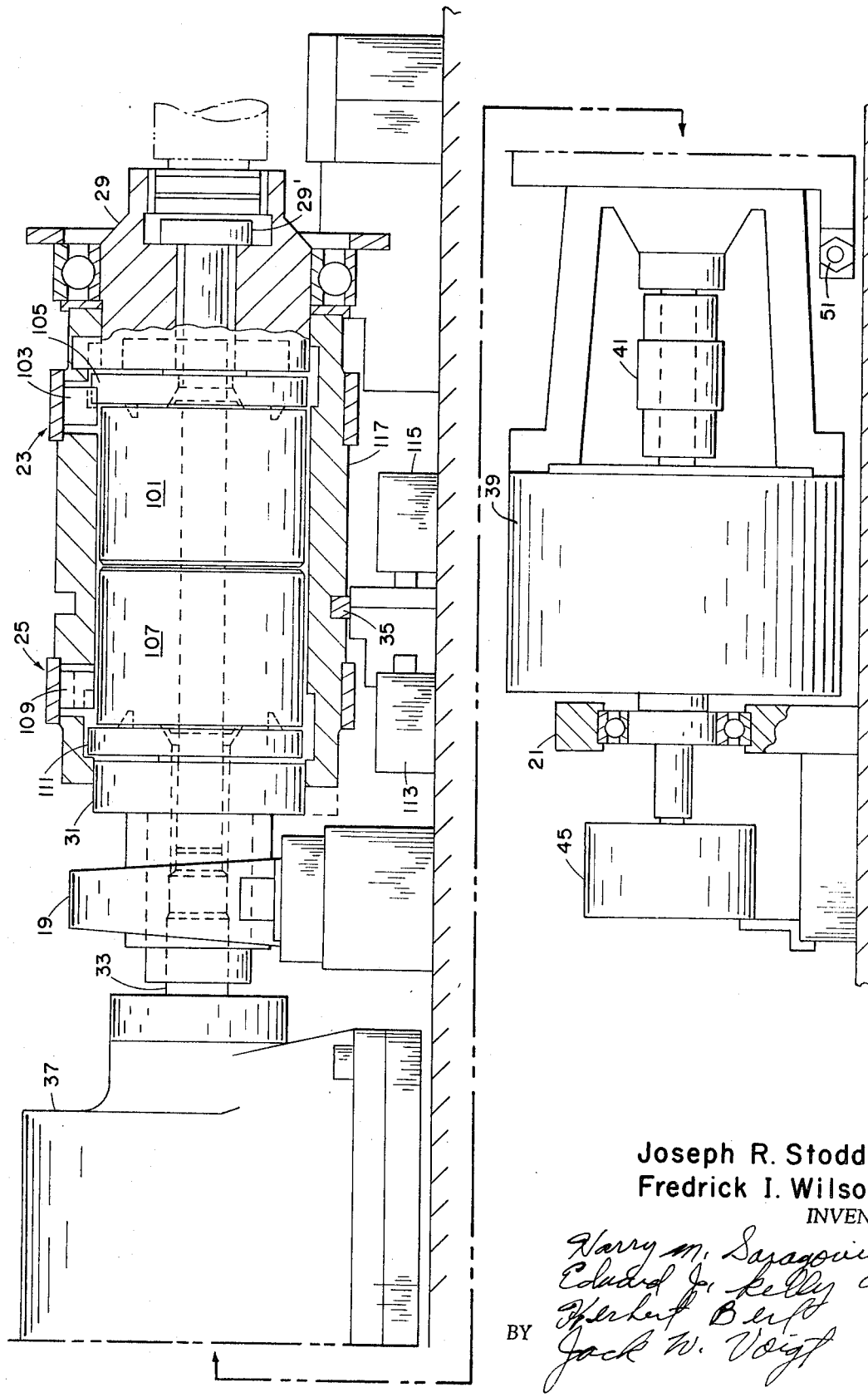
FIG. 2 is an elevation view partially in section of the dynamometer.

A shifter 35 is used to engage either clutch. When the clutch handle is at midpoint, both clutches are disengaged. The clutch handle is secured in position forward, back, or midpoint, by a ball detent, not shown. During its travel, the shifter operates limit switches 113, 115, for reverse or forward electrical interlock with motor 39. When a shifter 35 moves it also moves shifter plate 117 to cause either transfer pawl 103 or 109 to engage its corresponding plate for operation of either clutch 23 or 25. A high ratio geared reducer 37 has an output shaft connected to shaft 33 which supports reducer 37 and is directly coupled to the clutch assembly by means of coupler 31. The outer housing of reducer 37 is rigidly coupled to the housing of a variable speed motor 39 by means of an adapter 41. Motor 39 is accurately in line with reducer 37 and drives an input shaft of reducer 37 by means of a flexible coupling. Motor 39 is a double shaft motor, and the second shaft extends through bearing 21 for support of motor 39. The speed of motor 39 is controlled by a speed control dial 43 mounted on console 15.

A magneto tachometer 45 is driven by the second motor shaft, and the tachometer 45 energizes a speed indicator 47. Since there is a high fixed gear ratio between the motor and the low speed adapter shaft coupling 29, the indicator 47 reads degrees of revolution per minute of the coupling 29 with a high order of accuracy.

A crystalline detector load cell 49, more clearly shown in FIG. 4, is loaded in either of two directions by a connecting rod 51 between the load cell and the base of gear reducer 37, is supported on console table 15 by means of support member 53. Mounted on the console 15 is a torque indicator 55 which is energized by load cell 49 and which is calibrated to read inch pounds torque.

The remaining controls mounted on console 15 consist of a locked rotor test "on," "off" switch 57, speed indicator 47 clockwise or counterclockwise selector 59, speed indicator 47 zeroing adjustment means 61, torque indicator 55 zeroing adjustment means 63 and indicator 55 clockwise or counterclockwise selector 65.

An actuator 69 is shown, for the purpose of illustration only, setup for test. The actuator output gear, not shown, mates with coupling 29. The housing of actuator 69 is secured to a mounting 71 which is secured to base 7.

Power and control for the actuator 69 is from another console, the description of which is not pertinent to this invention.

OPERATION

Consider first, that an actuator 69 is properly mounted and that a "locked rotor" test is to be made in a "clockwise" direction. The shifter 35 is positioned to indicate "clockwise" position. Motor control 43 is "off" and locked rotor switch 57 is "on." The torque indicator 55 is "zeroed" with adjustment 65 and selector 63 is turned to clockwise.

Actuator 69 is energized and the actuator output gear attempts to rotate the assembly (23, 31, 37 and 39) as a unit, in bearings (17, 19 and 21). Motor 39 is not energized and does not rotate as a result of the actuator torque, because the geared reducer 37 will not "overrun." The only resistance to rotation of the assembly (23, 31, 37 and 39), neglecting the slight friction of the bearings, is the load cell 49, which is connected to reducer 37. As the torque from actuator 69 is increased, the reaction force on load cell 49 is increased proportionately. This force is indicated on the torque indicator 55 as torque output of actuator 69. As energy to the actuator is increased, so is torque, and finally (if the actuator proves acceptable on this test) the torque indicator will stabilize at the torque setting of a "slip" clutch in actuator 69.

It is convenient at this point to continue the "clockwise" test. The locked rotor test switch 57 is turned "off," the motor speed control 43 is set for a slow speed and selector 59 is set to "clockwise." Motor 39 now rotates, permitting the actuator 69 to rotate slowly in a clockwise direction. Actuator 69 is attempting to overdrive geared reducer 37, but motor 39 is holding the reducer speed below the "no-load" speed of the actuator 69. The driving torque of actuator 69 falls off with speed increase. A lower torque value is indicated on the torque indicator 55, and speed indicator 47 shows the speed of actuator 69 in degrees per minute. As the speed of motor 39 is increased, the torque will fall off until finally actuator 69 will be unloaded. Further increase of speed will simply overrun the overrunning clutch 23. Hence, the actuator is protected from overrunning loads.

The counterclockwise test is similar to the above through proper switch and control settings and manipulation.

It will be evident that it is possible with this invention to read-out any speed of the actuator between 0 and no-load speed, to simultaneously read torque output of the actuator, and to accurately maintain any desired speed within the actuator range.

We claim:

1. A device for testing the torque of ultra-low-speed machines comprising: a reversible variable speed motor; a reversible transmission coupled to said motor; said transmission being attached to a machine to be tested; a load cell connected to said transmission for detecting torque applied by said machine being tested; indicating means connected to said transmission and said motor for indicating torque and speed respectively of said machine being tested; and control means connected to said motor for controlling speed and direction of rotation of said motor.

2. A device for testing the torque of ultra-low-speed machines as set forth in claim 1 wherein said reversible transmission includes a clutch assembly, a shifter means for selectively engaging said clutch assembly for clockwise or counterclockwise rotation, and a high ratio geared reducer connecting said motor to said clutch assembly.

3. A device for testing the torque of ultra-low-speed machines as set forth in claim 2 wherein said load cell includes a crystalline detector, and a rod connecting said load cell to said reducer.

4. A device for testing the torque of ultra-low-speed machines as set forth in claim 3 further including a magneto tachometer connected to said motor for detecting motor speed.

5. A device as set forth in claim 4 wherein said indicating means includes a torque indicator responsive to the output of said load cell for indicating torque of said machine being tested and a speed indicator responsive to the output of said tachometer for indicating speed of said machine being tested.

References Cited

UNITED STATES PATENTS 1,892,295　12/1932　Walker _____ 73—134
3,138,018　6/1964　Pohl _____ 73—134

FOREIGN PATENTS 1,245,001　9/1960　France.
457,008　11/1936　Great Britain.

CHARLES A. RUEHL, Primary Examiner